(12) United States Patent
Yoshida

(10) Patent No.: US 7,774,853 B2
(45) Date of Patent: Aug. 10, 2010

(54) DOCUMENT PROCESSING DEVICE, AND DOCUMENT PROCESSING CONTROL METHOD THEREOF

(75) Inventor: Toru Yoshida, Bunkyo-ku (JP)

(73) Assignee: Canon Kabushiki Kaisha (JP)

( * ) Notice: Subject to any disclaimer, the term of this patent is extended or adjusted under 35 U.S.C. 154(b) by 1196 days.

(21) Appl. No.: 11/366,362

(22) Filed: Mar. 2, 2006

(65) Prior Publication Data

US 2006/0200867 A1 Sep. 7, 2006

(30) Foreign Application Priority Data

Mar. 4, 2005 (JP) ............................. 2005-061333

(51) Int. Cl.
*G06F 17/30* (2006.01)
(52) U.S. Cl. .......................... 726/28; 726/27
(58) Field of Classification Search ............. 726/27–30; 713/168–181
See application file for complete search history.

(56) References Cited

U.S. PATENT DOCUMENTS

2002/0184517 A1* 12/2002 Tadayon et al. ............. 713/200
2003/0061201 A1* 3/2003 Grefenstette et al. ........... 707/3

FOREIGN PATENT DOCUMENTS

JP 2003-330638 A 11/2003

* cited by examiner

*Primary Examiner*—Kambiz Zand
*Assistant Examiner*—Amare Tabor
(74) *Attorney, Agent, or Firm*—Rossi, Kimms & McDowell LLP

(57) ABSTRACT

A document processing device comprises, an authentication unit adapted to authenticate the user, a history information storage unit adapted to store history information indicating that document data was processed after the document data was stored in a document management server, the history information including identification information for identifying the document data was processed after the document data was stored in a document management server, a user access right judgment unit adapted to judge whether or not the authenticated user has an access right to each document data corresponding to the identification information included in the history information, a display unit adapted to display information for enable a user to select the document data to which the authenticated user has the access right from among the document data corresponding to the identification information included in the history information, and a processing unit adapted to process to the document data selected by the user.

8 Claims, 13 Drawing Sheets

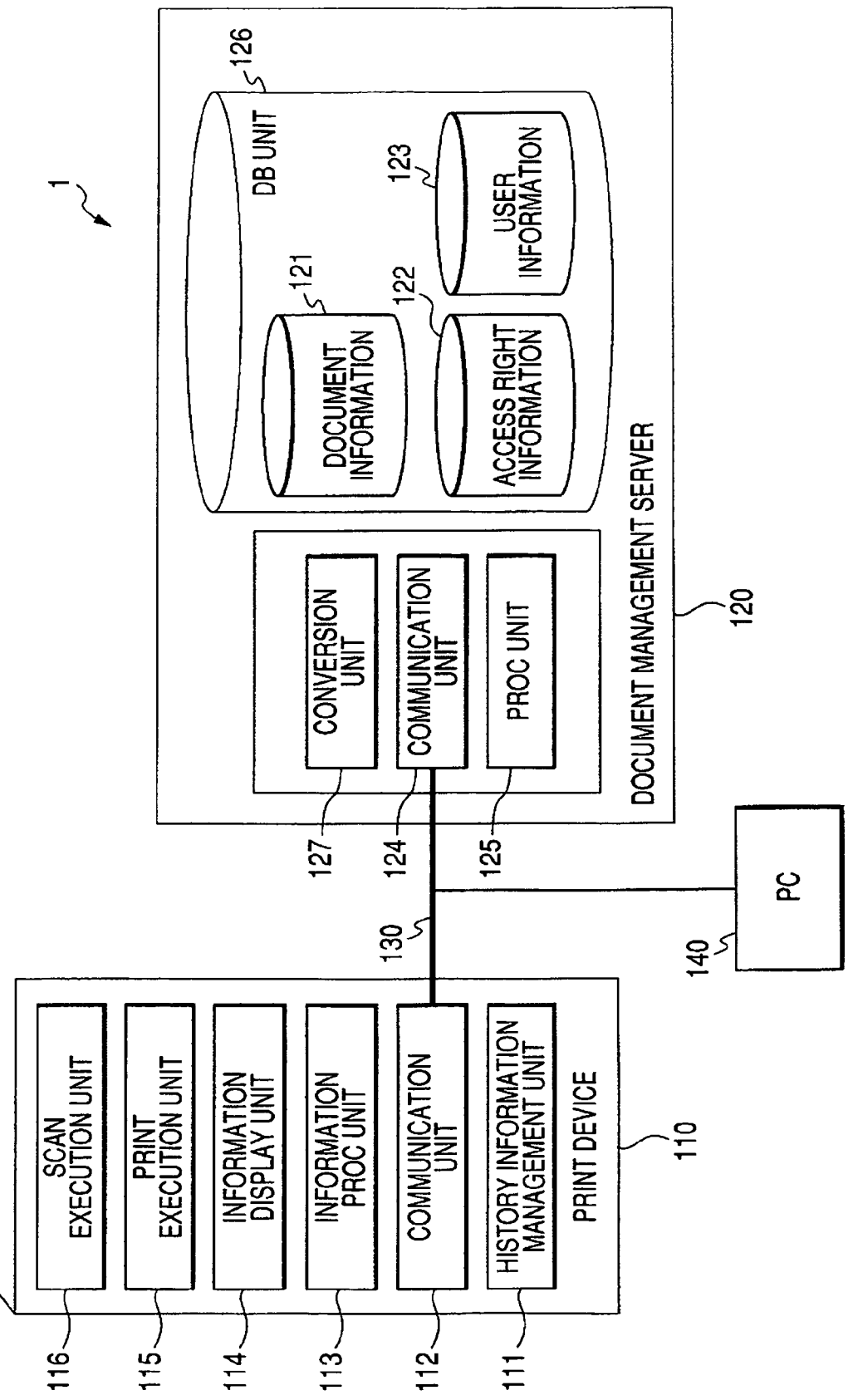

| DOCUMENT ID | OPERATION DATE AND TIME |
|---|---|
| 5454235468 | 2004/12/01 10:10:36 |
| 3541254684 | 2004/12/01 10:10:36 |

| 5454235468 | 2004/12/01 18:21:54 |
|---|---|
| 3541254684 | 2004/12/01 10:10:36 |

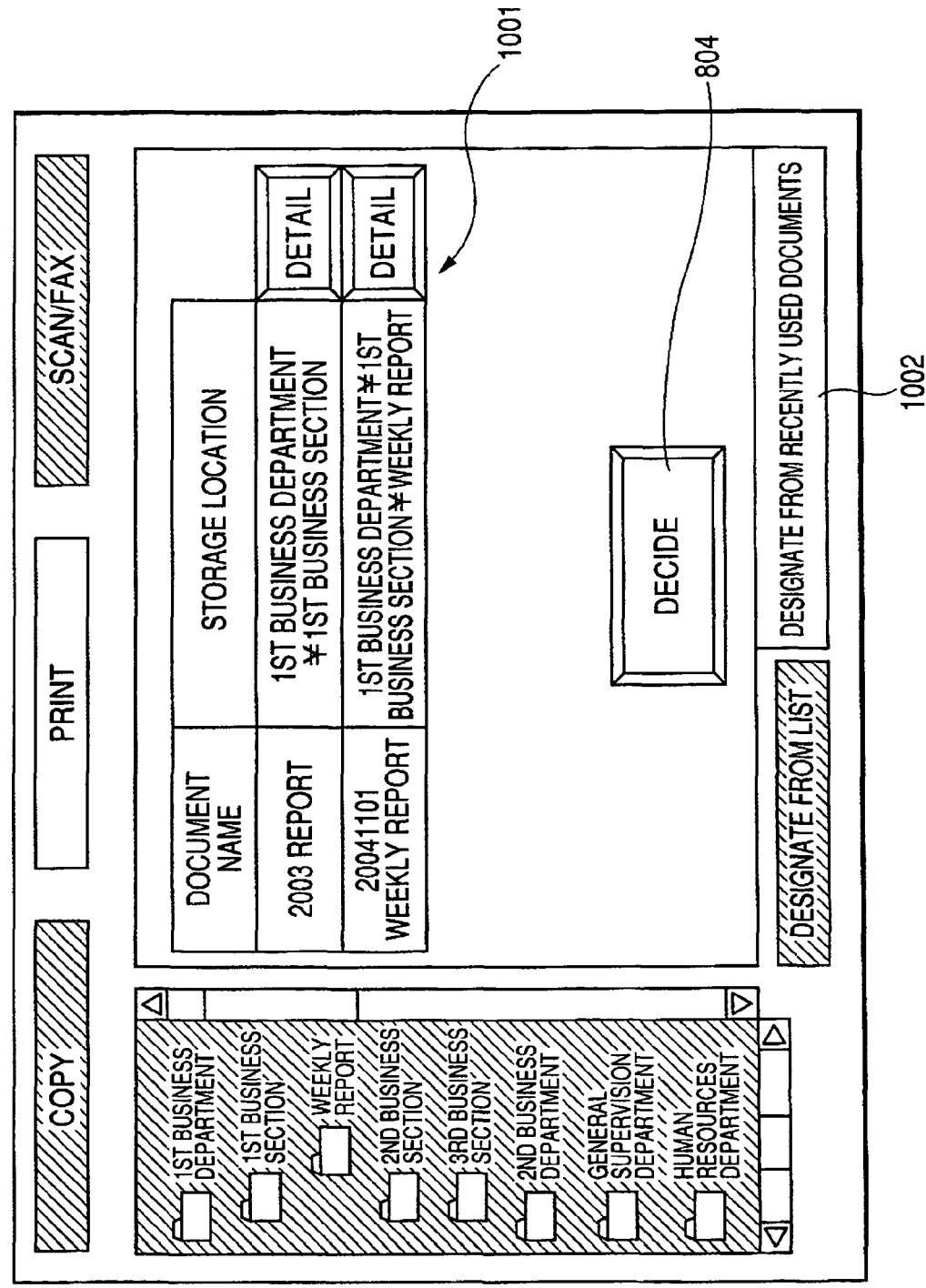

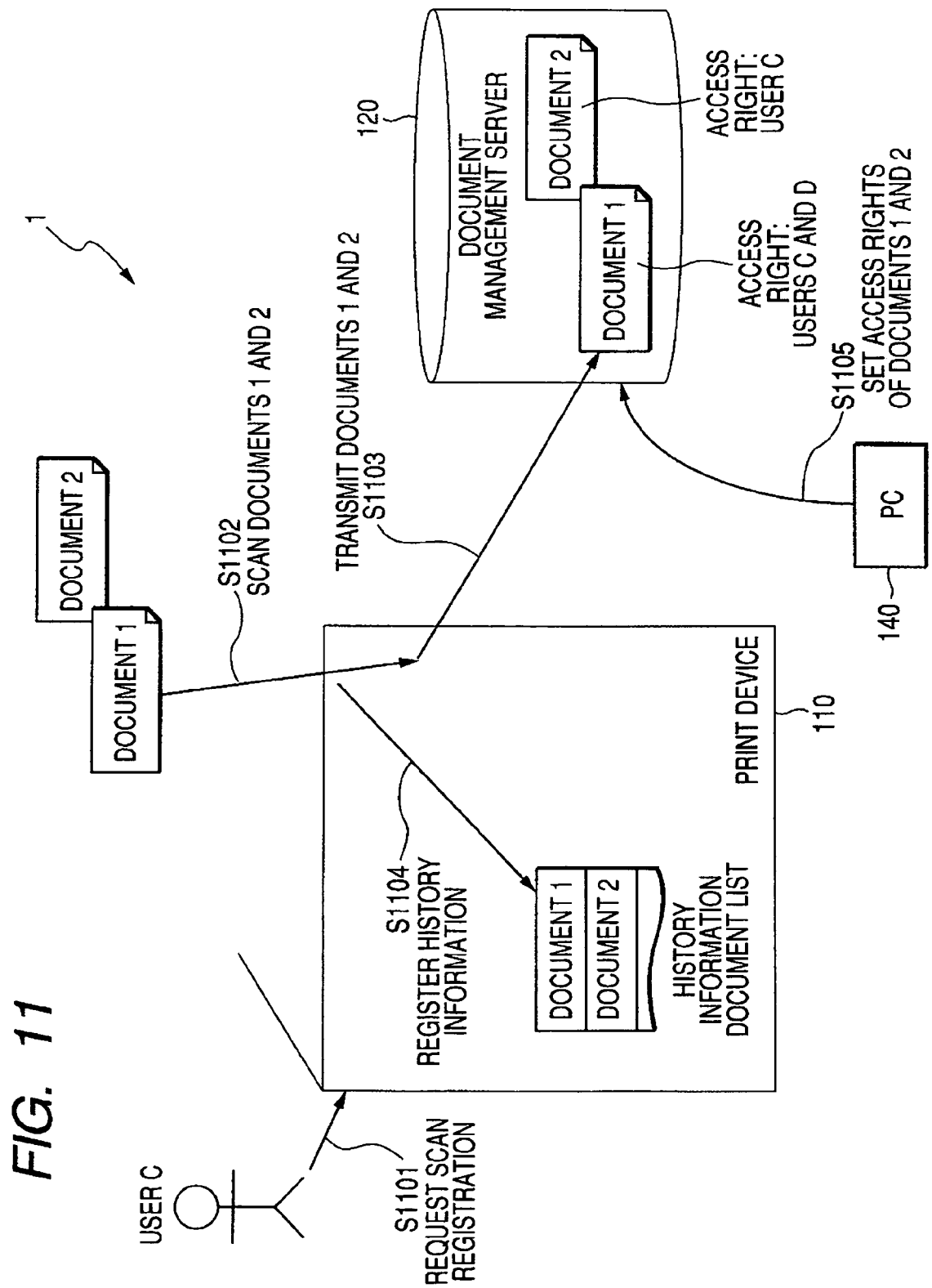

FIG. 13

| DOCUMENT ID | OPERATION DATE AND TIME | PRINT FORMAT |
|---|---|---|
| 5454235468 | 2004/12/01 10:10:36 | DOUBLE SIDED, COLOR, BOOKBINDING, SADDLE STITCH |
| 3541254684 | 2004/12/01 10:10:36 | ONE SIDED, MONOCHROME, TWO SIDES, NO STAPLING |

DOCUMENT PROCESSING DEVICE, AND DOCUMENT PROCESSING CONTROL METHOD THEREOF

BACKGROUND OF THE INVENTION

1. Field of the Invention

The present invention relates to a document management system, a document processing device, a document processing control method thereof, and a program for executing the document processing control method. More particularly, the present invention relates to the document management system and the document processing device which execute a document process by using document process history information, and the document processing control method thereof.

2. Related Background Art

In recent years, as document data have been digitized widely, a document management system which consists of a document management server for managing the document data, and various client devices such as a PC (personal computer), a printer and the like has come to be used. Thus, a user can access the document management server from the client device such as the PC, the printer or the like, and, by using the client device, execute document processes such as document registration, document acquirement, document update, document print and the like with respect to the document management server.

On the other hand, as the conventional art, the printer which comprises the storage unit for storing, every time a print job is executed, history information of the print job and PDL (page-description language) data corresponding to the relevant history information is disclosed (for example, Japanese Patent Application Laid-Open No. 2003-330638). In this printer, if a user indicates the print job by selecting one of the history information stored in the storage unit, the PDL data corresponding to the selected history information is read, whereby the read PDL data can be reprinted.

Therefore, if the relevant printer is applied to the client device in the document management system, it is thought that a trouble that a user specifies desired data from among a huge amount of document data managed by the document management server and then designates the specified desired data as print data can be reduced.

However, the relevant printer comprising the storage unit for storing the history information is merely to simplify the reprint process to be executed in response to the operation by an individual user. In other words, the relevant printer is merely corresponding to a local environment. For this reason, even where the relevant printer is directly applied to the client device, when one user (called a user 1) executes the print process with respect to the document data that the user 1 wishes to conceal from another user (called a user 2), there is a problem that the user 2 can acquire the printed matter corresponding to the relevant document data on the basis of the history information and thus the contents of the relevant document data leak.

The above problem can be solved by enabling only the user 1 who indicated the print process to actually execute the print process based on the history information. However, even in that case, there is a problem that, if the user 1 executes the print process for, e.g., shared document data, the user 2 cannot reprint the relevant shared document data based on the history information.

Further, since the above conventional art discloses the method by which the document data subjected to the print process in the past is used for the reprint process, even where a document process other than the print process was executed in the past, the document data concerning the relevant document process cannot be used for the reprint process.

SUMMARY OF THE INVENTION

An object of the present invention is to provide a document processing device which can, in a case where a user wishes to execute, by designating desired document data, a document process based on the designated document data, reduce a trouble of specifying the desired document data from among a huge amount of document data and conceal the data to which the user does not have an access right, a document processing method which is applicable to the document management system and the document processing device, and a program which is used to execute the document processing method.

To achieve the above object, according to one aspect of the present invention, there is provided a document processing device comprises, an authentication unit adapted to authenticate the user, a history information storage unit adapted to store history information indicating that document data was processed after the document data was stored in a document management server, the history information including identification information for identifying the document data was processed after the document data was stored in a document management server, a user access right judgment unit adapted to judge whether or not the authenticated user has an access right to each document data corresponding to the identification information included in the history information, a display unit adapted to display information for enable a user to select the document data to which the authenticated user has the access right from among the document data corresponding to the identification information included in the history information, and a processing unit adapted to process to the document data selected by the user.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiment of the present invention and, together with the description, serve to explain the principles of the present invention.

FIG. 1 is a block diagram schematically showing the constitution of the document management system according to the embodiment of the present invention;

FIG. 2A shows the document information, FIG. 2B shows the access right information, and FIG. 2C shows the user information;

FIG. 9A shows the history information before update, and FIG. 9B shows the history information after update;

FIG. 10 is a diagram showing, in the case where the print operation is selected by the user, the display screen to be displayed after the "DESIGNATE FROM RECENTLY USED DOCUMENTS" button is depressed on the document operation screen of the information display unit shown in FIG. 1;

FIG. 11 is a diagram for explaining a modification of the history information storage process to be executed by the document management system shown in FIG. 1;

FIG. 13 is a diagram showing a modification of the history information shown in FIG. 9.

DETAILED DESCRIPTION OF THE PREFERRED EMBODIMENT

Figure 2A:
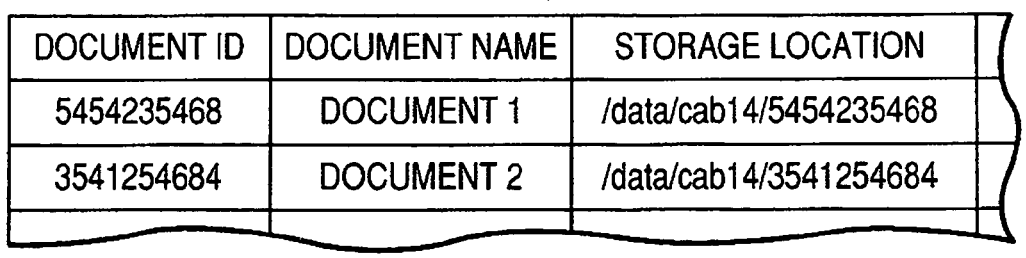
FIGS. 2A, 2B and 2C are diagrams showing the information to be managed in the DB (database) unit of the document management server, and, more specifically.

Hereinafter, the preferable embodiment of the present invention will be explained in detail with reference to the accompanying drawings.

FIG. 1 is a block diagram schematically showing the constitution of the document management system according to the embodiment of the present invention.

In FIG. 1, a document management system 1 consists of a print device 110, a PC 140 and a document management server 120. Here, the print device 110 acts as the client device which is operated by a user to execute a communication process for exchanging data through a network 130. Further, a general network such as a LAN (local area network), the Internet or the like is used as the network 130. Also, a physical cable such as a USB (Universal Serial Bus) or the like may be used as the network 130.

The print device 110 consists of a scan execution unit 116 for reading an original, a print execution unit (document processing means) 115 for executing a print process, an information display unit (display means) 114 for showing information to the user and also accepting requests from the user, an information processing unit 113 for generating the information to be shown to the user by the information display unit 114 and also analyzing the request accepted from the user, a communication unit 112 for executing communication with the document management server 120 through the network 130, and a history information management unit (history information storage means) 111 for managing the history information of the operations executed in the print device 110.

The document management server 120 consists of a communication unit 124 for executing a communication process with the print device 110 through the network 130, a processing unit 125 for receiving an access right request and a document acquirement request later explained with reference to FIG. 4 from the print device 110, analyzing the contents of these requests and executing the process according to the analyzed request in the document management server 120, a DB unit 126 for storing document information 121, access right information 122 and user information 123 later explained with reference to FIGS. 2A to 2C, and a conversion unit 127 for converting the managed document data into the data capable of being printed by the print device 110.

Incidentally, it is explained in FIG. 1 that the document management server 120 and the print device 110 are independent from each other. However, the document management server 120 and the print device 110 may be provided integrally. In such a case, one document processing device will consist of the history information management unit 111, the information processing unit 113, the information display unit 114, the print execution unit 115, the scan execution unit 116, the processing unit 125, the conversion unit 127 and the DB unit 126.

Figure 2B:
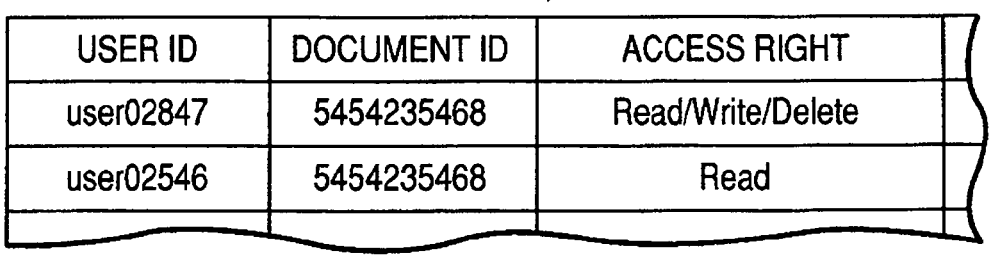
Figure 2C:
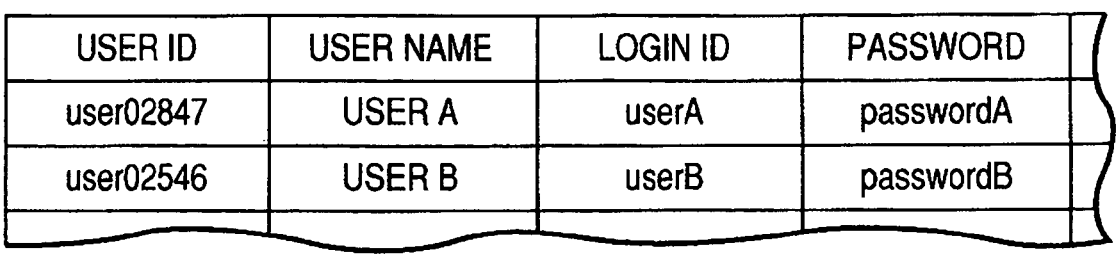

FIGS. 2A, 2B and 2C are diagrams showing the information to be managed in the DB unit 126 of the document management server 120 shown in FIG. 1.

As shown in FIGS. 2A to 2C, the DB unit 126 stores the document information 121, the access right information 122 and the user information 123.

The document information 121 is the information concerning the document data to be managed by the document management server 120. More specifically, the document information 121 is the information for managing the document ID information representing a unique value with respect to a document, the document name representing the name of the document data, and the storage location information representing the location where the document data is stored, in the mutually associated state. Incidentally, although only the document ID information, the document name and the storage location information are shown by way of example in the present embodiment, but the present invention is not limited to them. That is, another information concerning the document may be managed in association with the document ID information, the document name and the storage location information.

The access right information 122 is the information representing presence/absence of the user's access right for the document data managed by the document management server 120. More specifically, the access right information 122 is the information for managing the user ID information, the document ID information and the access right information "Read (reading)/Write (generating and changing)/Delete (deleting)/Nothing (no access right)" in the mutually associated state.

The user information 123 is the information representing the user who can use the document management system 1. More specifically, the user information 123 is the information for managing the user ID information representing a unique value with respect to the user, the user name information representing a name of the user, and the login ID information representing a login ID of the user, and the password information representing a password of the user, in the mutually associated state.

Hereinafter, a case where, after a user A printed a document 1 and a document 2 by the print device 110, a user B prints the document 1 by using the history information of the print operation by the user A will be explained with reference to FIGS. 3 and 4.

Figure 3:
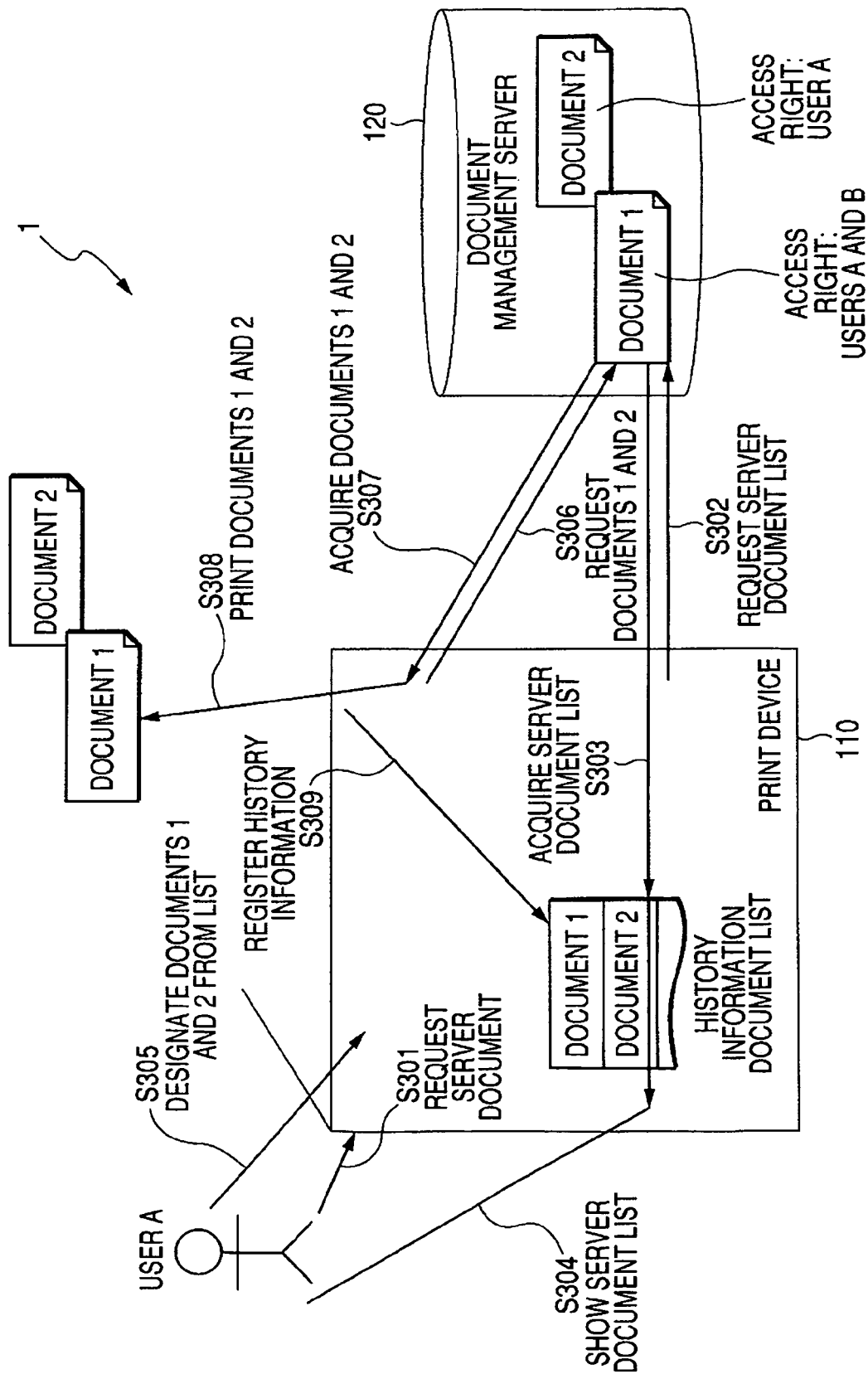
FIG. 3 is a diagram for explaining a history information storage process executed by the document management system shown in FIG. 1.

FIG. 3 is the diagram for explaining a history information storage process which is executed by the document management system 1.

Figure 5:
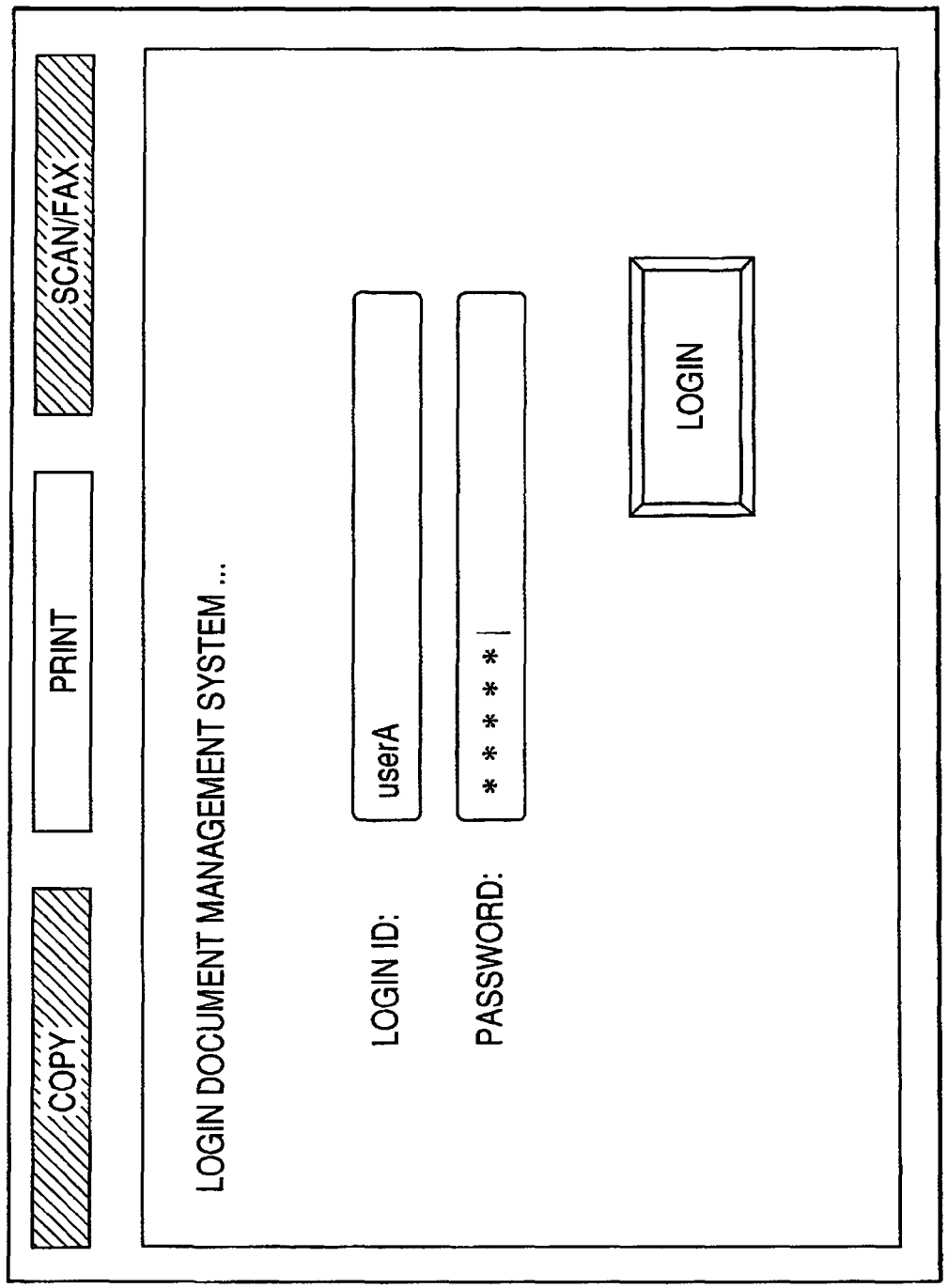
FIG. 5 is a diagram showing the login screen to be displayed on the information display unit shown in FIG. 1.

In FIG. 3, the print device 110 first displays the document processing menu on the information display unit 114. Then, in a case where the user A selects the print process from the displayed document processing menu, the print device 110 displays a login screen 500 (FIG. 5) on the information display unit 114 to request the user A to input the login ID and the password.

If the login ID and the password are input by the user A, the print device 110 transmits a login request consisting of the input login ID and the input password to the document management server 120 through the communication unit 112.

Then, if the login request from the print device 110 is received through the communication unit 124, the document management server 120 causes the processing unit 125 to check the user information managed in the user information 123 with the login ID and the password both included in the received login request. If the check by the document management server 120 succeeds, then the document management server 120 notifies the print device 110 through the communication unit 124 that the user A has been logged in.

Figure 8:
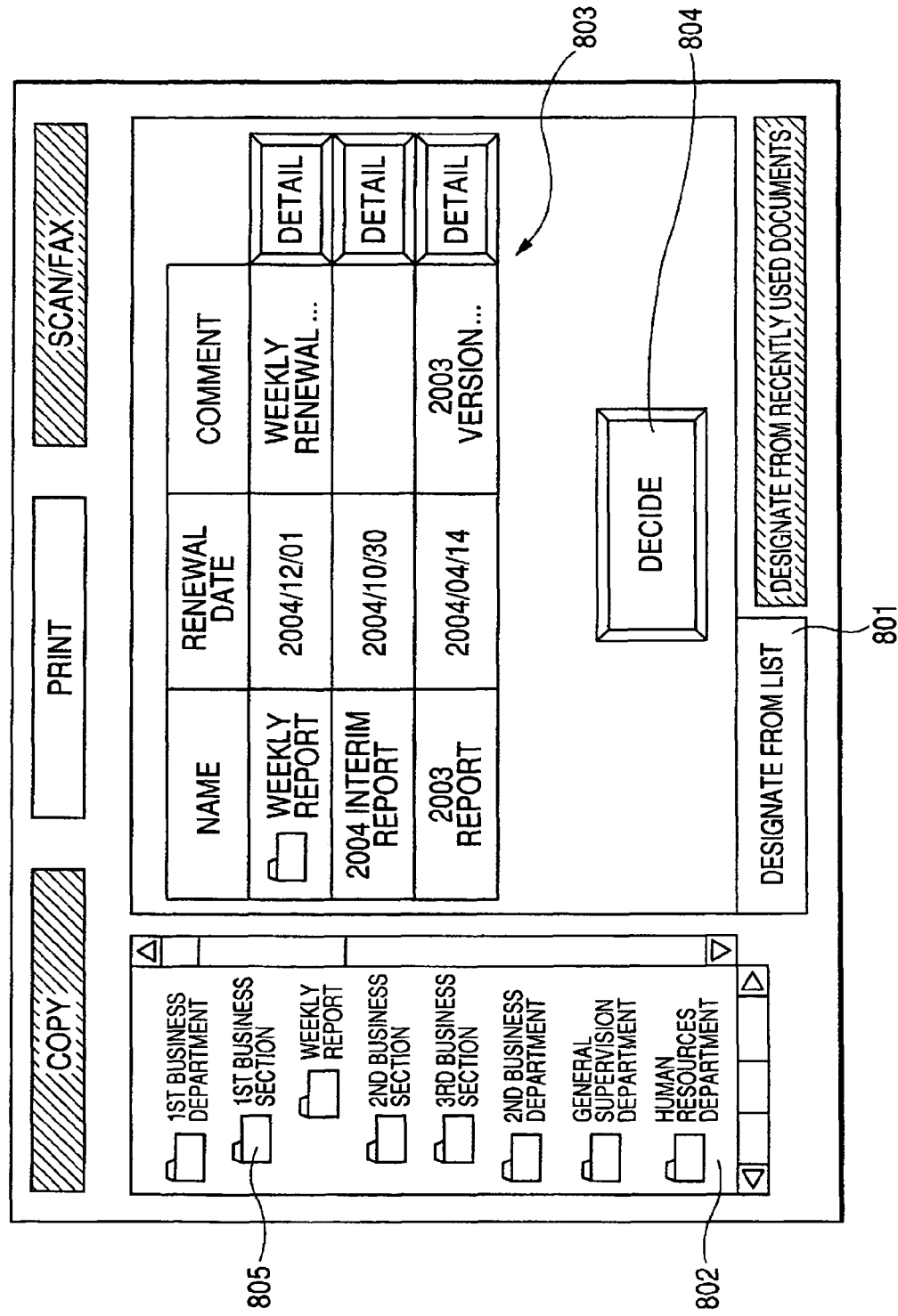
FIG. 8 is the diagram showing, in a case where the print operation is selected by a user, the display screen to be displayed after the "DESIGNATE FROM LIST" button is depressed on the document operation screen of the information display unit shown in FIG. 1.

Subsequently, if the notification that the user A has been logged in is received from the document management server 120, the print device 110 displays a document operation screen 800 shown in FIG. 8. After then, if the request (server document request) to designate the print document from the document data of the document information 121 managed by the document management server 120 is issued from the user A on the document operation screen 800 (step S301), the print device 110 requests the document management server 120 to transmit the list including the server documents (step S302). More specifically, if a "DESIGNATE FROM LIST" button 801 shown in FIG. 8 is selected by the user, the print device 110 detects that the document designation from the list is requested.

If the server document list request is received, the document management server 120 generates the data representing the list of the document data capable of being accessed by the logged-in user A, by using the access right information 122 and the document information 121. Then, the document management server 120 transmits the generated data to the print device 110 as a server document list.

If the print device 110 acquires the server document list form the document management server 120 (step S303), the acquired server document list is converted into the data (that is, a folder tree 802 and a list screen 803) capable of being displayed by the information display unit 114, and the document in the converted data is shown by using the information display unit 114 so as to be selectable by the user (step S304). Then, if the documents (that is, the document 1 and the document 2 in the present embodiment) are designated in the shown list by the user A (step S305), the print device 110 requests the document management server 120 to acquire the document 1 and the document 2 through the communication unit 112 (step S306). More specifically, if a "DECIDE" button 804 shown in FIG. 8 is selected by the user, the print device 110 detects that the document acquisition request is issued.

If the document acquisition request is received from the print device 110, the document management server 120 acquires the document 1 and the document 2 in the document information 121. Then, the acquired information is converted by the conversion unit 127 into the data capable of being printed, and the converted data is then transmitted to the print device 110.

Figures 9A, 9B:
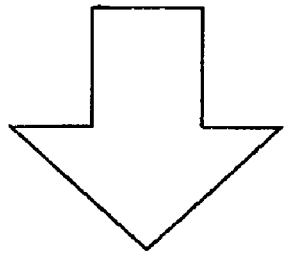
FIGS. 9A and 9B are diagrams for explaining history information managed by the history management unit shown in FIG. 1, and, more specifically.

If the data representing the documents 1 and 2 capable of being printed is acquires from the document management server 120 (step S307), the print device 110 displays the print format setting screen. Then, the received data is printed by the print execution unit 115 in the document print format selected by the user based on the displayed contents (step S308). If the print ends, as shown in FIG. 9A, the print device 110 registers the information concerning the printed document data and the date and time when the print was executed (that is, the document ID information and the operation date and time information managed by the document management server 120) to the history information management unit 111 as the history information (step S309).

In the explanation of FIG. 3, the print device 110 prints the document data selected by the user A. However, the present invention is not limited to this. That is, it is possible to attach the document data selected by the user A to an electronic mail and then transmit the relevant electronic mail to a predetermined electronic mail address, and it is also possible to transmit the document data selected by the user A through facsimile.

Figure 4:
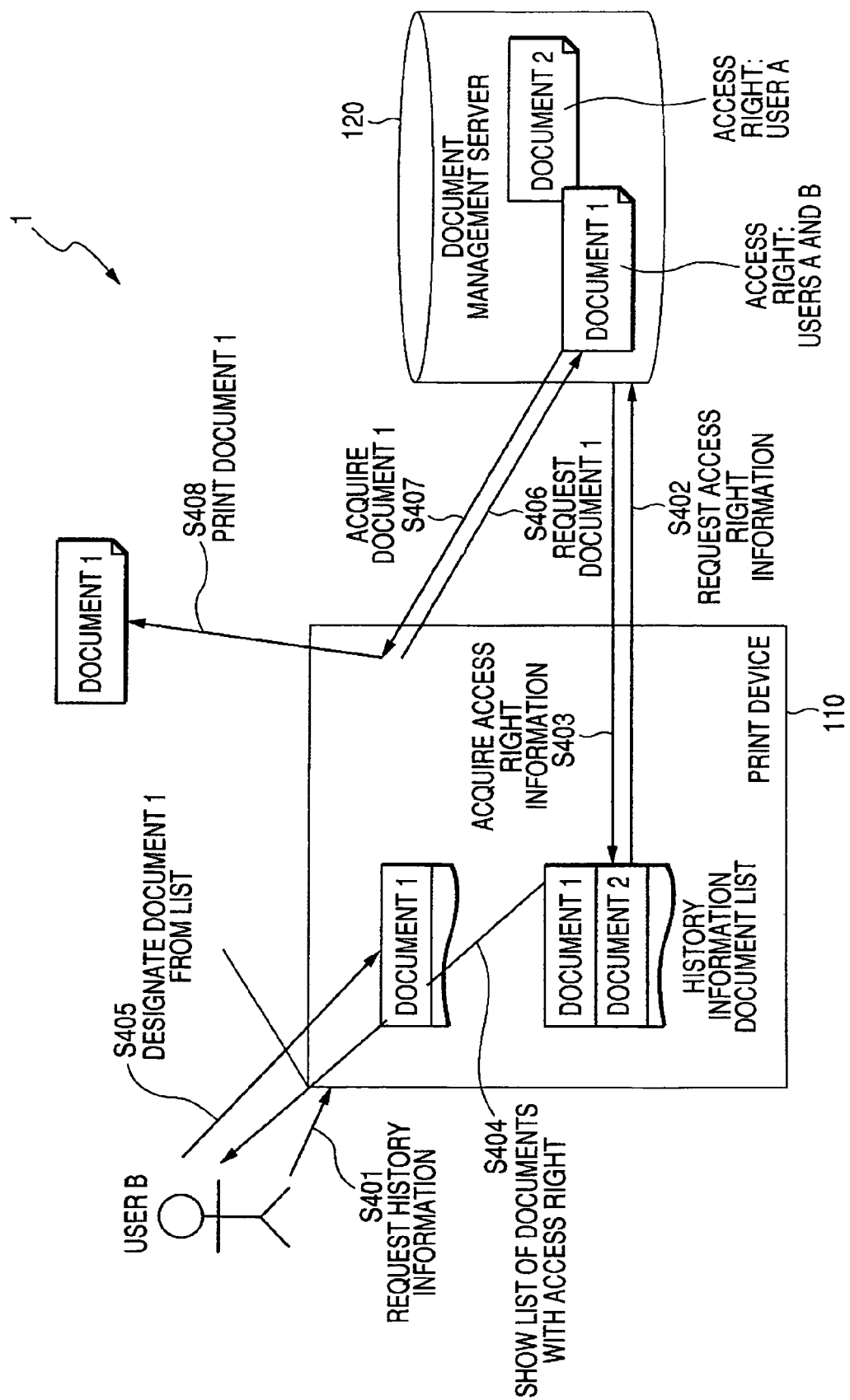
FIG. 4 is a diagram for explaining a reprint process executed by the document management system shown in FIG. 1.

FIG. 4 is the diagram for explaining a reprint process which is executed by the document management system 1.

In FIG. 4, in the first instance, the print device 110 executes the process same as the login process for the user A shown in FIG. 3, whereby a user B is logged in. Thus, the document operation screen 800 as shown in FIG. 10 is displayed on the information display unit 114. Then, when a request (history information request) to designate the print document from the list of the recently used documents is input by the user B on the document operation screen 800 through the print device 110 (YES in step S401), the process advances to a step S402. Here, if a "DESIGNATE FROM RECENTLY USED DOCUMENTS" button 1002 shown in FIG. 8 is selected by the user, the print device 110 detects that the history information is requested. Incidentally, in the present embodiment, it is assumed that only the print operation histories of the documents 1 and 2 by the user A exist in the history information.

In the step S402, the print device 110 requests the access right information to the document management server 120. Here, it should be noted that the access right information represents, from among the document data corresponding to the document ID included in the history information, to which document data the user B has the access right. After then, the access right information generated by the document management server 120 is acquired in response to such a request (step S403), and the list of the documents to which the user B has the access right is generated based on the acquired access right information. Incidentally, the process from the step S402 to the document list generation will be explained in detail with respect to a later-described document list generation process shown in FIG. 6.

Next, the print device 110 causes the information display unit 114 to show the list (a list screen 1001 shown in FIG. 10) of the documents capable of being reprinted, based on the generated history information (step S404). Here, it should be noted that the documents on the list screen 1001 are displayed so as to be selectable by the user, and only the document 1 is displayed on the list screen 1001 in the present embodiment.

If one of the documents included in the shown list (that is, the document 1 in the present embodiment) is designated by the user B (step S405), the print device 110 requests, through the communication unit 112, the document management server 120 to acquire the document 1 by using the document ID (step S406). More specifically, if the "DECIDE" button 804 shown in FIG. 10 is selected by the user, the print device 110 detects that the document acquisition request is issued.

If the document acquisition request from the print device 110 is received by the document management server 120, the document data of the document 1 in the document information 121 is acquired by the processing unit 125. Then, the acquired information is converted by the conversion unit 127 into the data capable of being printed, and the converted data is then transmitted to the print device 110.

If the data representing the document 1 capable of being printed is acquires from the document management server 120 (step S407), the print device 110 displays the print format setting screen. Then, the received data is printed by the print execution unit 115 in the document print format selected by the user based on the displayed contents (step S408).

According to the processes shown in FIGS. 3 and 4, in the case where the history information is requested from the user B (step S401) after the history information was registered in the processes as shown in FIG. 3, the print device 110 acquires the access right information from the document management server 120 (steps S402 and S403). Then, the list of the document data, to which the user B has the access right, from among the document data (document 1 and document 2) corresponding to the identification information included in the history information is generated based on the acquired access right information, and the generated list is shown to the user (step S404). Subsequently, when the user B designates the document 1 from the shown list (step S405), the print data of the document 1 is acquired from the document management server 120 (steps S406 and S407), and the acquired print data is actually printed (step S408). Thus, even if the document management server 120 has to manage a huge amount of document data when the user B executes the print process by using the print device 110, it is possible to reduce a trouble of designating as the print data one document data from among the huge amount of document data.

Further, the print device 110 does not display on the list screen 1001 the document 2 to which the user B does not have the access right. Thus, it is possible to conceal, from among the document data to be managed by the document management server 120, the document data (the document 2) to which the user B does not have the access right. As a result, since it is possible to inhibit the user B from indicating the print of the document 2, it is possible to increase security and it is also possible to prevent occurrence of operation errors.

Moreover, if the print ends in the step S408, as shown in FIG. 9B, the operation date and time information of the print operation history information for the document 1 managed by the history information management unit 111 is updated from the information representing the date and time when the print process is executed by the user A to the information representing the date and time when the reprint process is executed by the user B. After the information was updated, the list of the documents capable of being subjected to the reprint process based on the history information is updated. Thus, the user can always execute the print process based on the latest history information.

Furthermore, when the list is shown to the user B in the step S404, it is possible to simultaneously display the name of the document data to which the document process was executed in the past, the storage destination of the relevant document data in the document management server 120, and the date and time information representing the date and time when the relevant document process was executed. Thus, it is possible to grasp or comprehend all at once the contents of the document data that the authenticated user can designate as the print data.

Moreover, in the present embodiment, since the access right settings that the plural client devices including the print device 110 request to change are updated in a lump by the document management server 120, it is possible to instantly reflect such update in the print process based on the history information, whereby it is possible to easily mange the whole system.

In the explanation of FIG. 4, the document data selected by the user B is printed by the print device 110. However, the present invention is not limited to this. That is, it is possible to attach the document data selected by the user B to an electronic mail and then transmit the relevant electronic mail to a predetermined electronic mail address, and it is also possible to transmit the document data selected by the user through facsimile.

Figure 6:
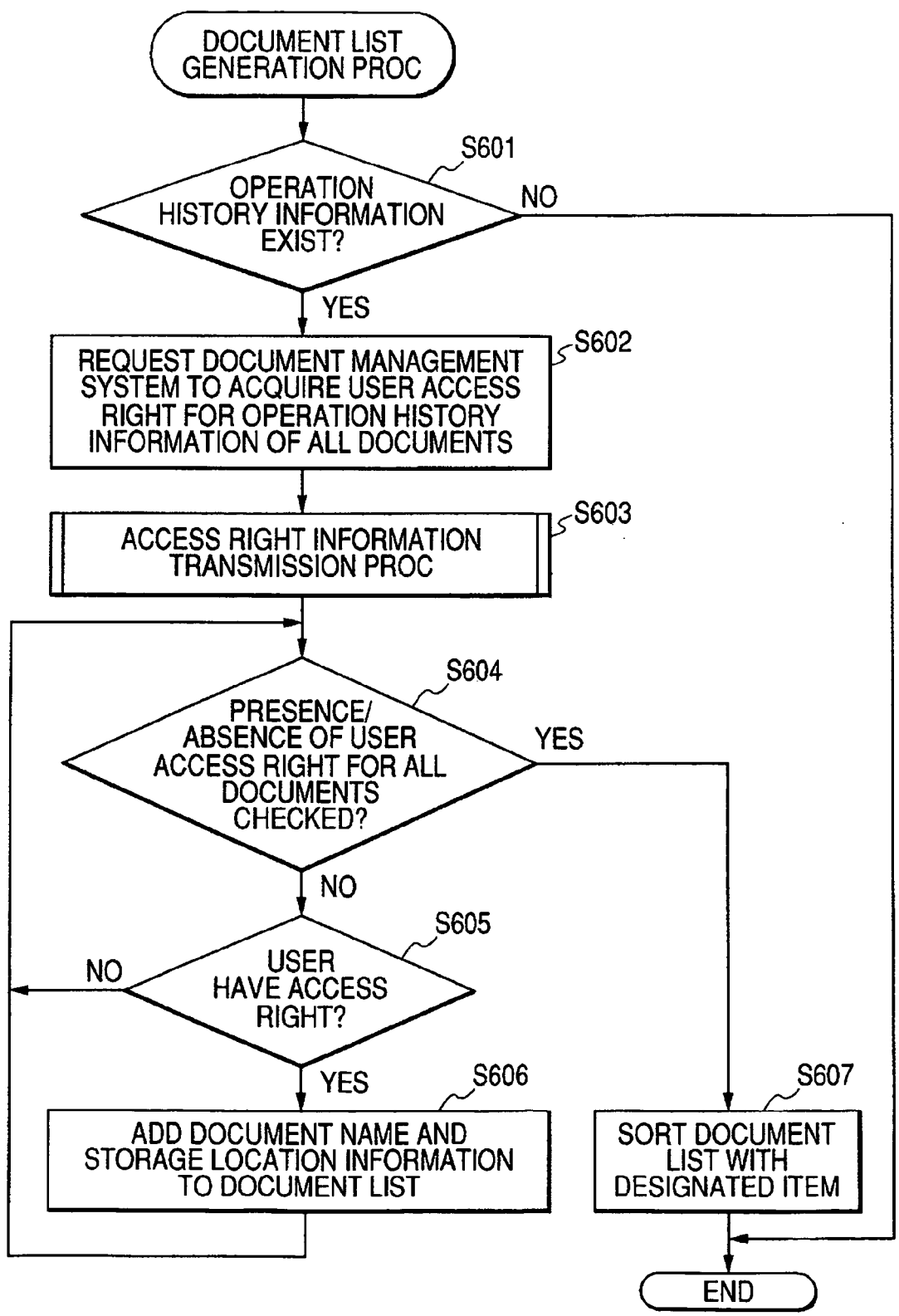
FIG. 6 is a flow chart showing the procedure of a document list generation process executed by the print device shown in FIG. 1.

FIG. 6 is a flow chart showing the procedure of the document list generation process to be executed by the print device 110 shown in FIG. 1.

In FIG. 6, it is first judged whether or not the history information exists in the history information management unit 111 (step S601). Then, if it is judged that the history information exists in the history information management unit 111, it requests, to the document management server 120 through the communication unit 112, the acquisition of the access right information of the user B for the history information of all the documents executed in the past with respect to the document management server 120 (step S602). At that time, all the document ID's and the user ID of the user B stored as the history information are simultaneously transmitted to the document management server 120.

If the request of the acquisition of the access right information is received through the communication unit 124, the document management server 120 executes a later-described access right information transmission process shown in FIG. 7 to transmit the access right information including the document ID of the document to which the user B has the access right to the print device 110 (step S603).

If the access right information is received from the document management server 120, it is judged by the print device 110 whether or not the check of presence/absence of the access right of the user B to the history information of all the document executed for the document management server 120 in the past ends (step S604). More specifically, if the comparison of the access right information received from the document management server 120 with all the document ID's of the documents included in the history information ends, it is judged that the check ends.

If it is judged in the step S604 that the check does not end, it is further judged whether or not the user B has the access right to the document to which the check does not end (step S605). More specifically, if the document ID of the document to which the check is currently executed is included in the access right information received from the document management server 120, it is judged that the user B has the access right to the relevant document. Meanwhile, if the document ID is not included in the access right information, it is judged that the user B does not have the access right to the relevant document.

Then, after the step S605, the document name and the storage location information are directly added to the document to which the user B does not have the access right, or the document name and the storage location information are added to the document list of the document to which the user B has the access right (step S606). Subsequently, the processes in the step S604 and the subsequent steps are repeated.

If it is judged in the step S604 that the check ends, the document list is sorted with the designated item (step S607), and the document list generation process ends.

Figure 7:
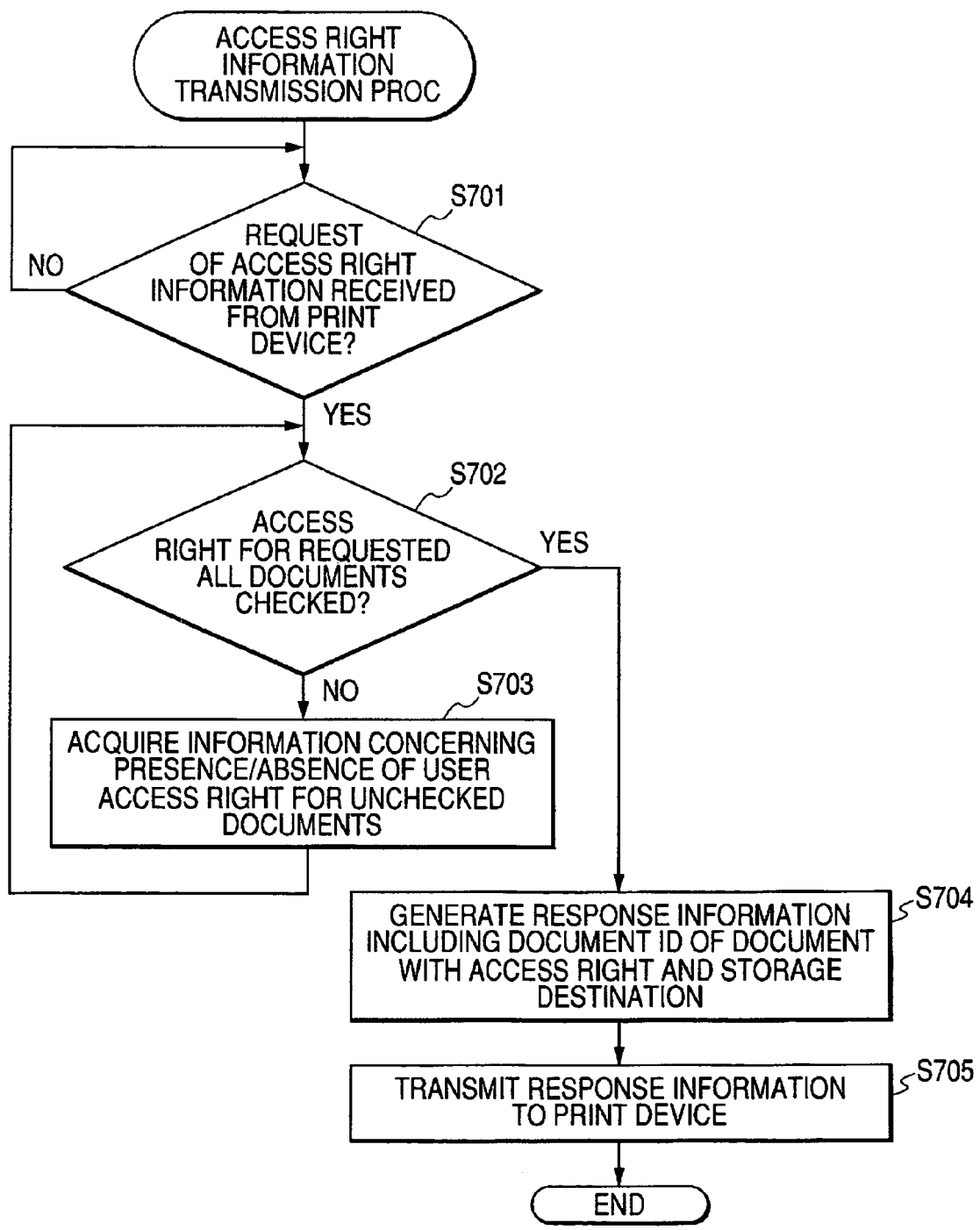
FIG. 7 is a flow chart showing the procedure of an access right information transmission process in the step S603 shown in FIG. 6.

FIG. 7 is a flow chart showing the procedure of the access right information transmission process in the step S603 shown in FIG. 6.

Here, it should be noted that the access right information transmission process is executed by the document management server 120.

In FIG. 7, if the request of the step S602 to acquire the access right information of the user B is received from the print device 110 by the processing unit 125 (YES in a step S701), it is then judged whether or not the check of presence/absence of the access right of the user B to all the documents ends (step S702). More specifically, if the comparison of the access right information 122 with all the documents of the document ID transmitted from the print device 110 when the request of the step S602 is issued ends, it is judged that the check ends. In the present embodiment, since the history information includes only the histories of the print operations of the document 1 and the document 2, it is judged in the step S702 whether or not the check of presence/absence of the access right to the document 1 and the document 2 ends.

If it is judged in the step S702 that the check does not end, the information representing whether or not the user B has the access right to the document to which the check does not end is acquired (step S703), and the processes in the step S702 and the subsequent steps are repeated. In the acquisition process, if the user ID of the user B is included in the user ID of the document in the access right information 122, it is judged that the user B has the access right. Meanwhile, if the user ID of the user B is not included in the user ID of the document in the access right information 122, it is judged that the user B does not have the access right.

Then, when the check ends in the step S702, the document ID and the storage destination information thereof are acquired with respect to the document to which the information to which the user B has the access right is acquired in the step S703, and the access right information including the acquired various information data is generated (step S704). In the present embodiment, since it is set that the user B has the access right only to the document 1, the document management server 120 generates the access right information including the document ID of the document 1 and the storage destination information thereof.

After then, the generated access right information is transmitted from the communication unit 124 to the print device 110 (step S705), and the access right information transmission process ends.

According to the processes shown in FIGS. 6 and 7, as well as the access right request, the print device 110 transmits the document ID and the user ID of the user A included in the history information to the document management server 120 (step S602), and, through the access right information transmission process, the print device 110 receives the access right information including the document ID from the document management server 120 (step S603). In this instance, it is judged that the user B has the access right to the document data of the relevant document ID (YES in step S605). On the other hand, as well as the reception of the access right request from the print device 110 in the step S602, the document management server 120 receives the document ID (step S701). Then, in the document management server 120, the access right information including the document ID of the document data that the access right is set to the transmitted user ID based on the access right information 122 included in the received document ID is generated (step S704), and the generated access right information is transmitted to the print device 110 (step S705). Thus, it is possible on the side of the print device 110 to surely judge to which of the document data corresponding to the document ID included in the history information the user B has the access right. Further, if there is the document to which the user B has the access right from among the documents included in the history information (YES in step S605), the document name of the relevant document and the information of the storage location of the relevant document are added to the document list of the documents capable of being reprinted (step S606). Thus, it is possible to surely conceal from the user B the document data that the user A does not wish to make the user B to know the contents.

FIG. 8 is the diagram showing the document operation screen to be displayed in the step S304 of FIG. 3.

More specifically, the screen shown in FIG. 8 is the screen which is displayed in the step S304 after the server document is requested by the user in the step S301 by selecting the "DESIGNATE FROM LIST" button 801 on the document operation screen 800 with the user.

On the screen shown in FIG. 8, if a folder 805 in which the desired document data have been held is selected by the user in a leftward folder tree 802, the list of the document data held in the selected folder 805 is displayed on a center list screen 803. Then, the user A selects the document corresponding to the desired data (document 1 and document 2) from the document data list displayed on the list screen 803.

For example, if the folder which contains the data desired by the user A exists on the tenth layer (hierarchy), it is necessary to open the relevant layer by selecting the folders of the folder tree 802 ten times. Further, since the number of document data capable of being displayed on the list screen 803 at a time is limited, if a large number of document data are held in one folder, it is necessary to browse the document data in the relevant folder by scrolling them. Furthermore, if the user does not correctly know or grasp in which folder the desired data has been stored, the user A has to search various folders displayed in the folder tree 802. In such a case, the user A has to open the layers by selecting ten or more folders.

FIG. 10 is a diagram showing the document operation screen which is displayed in the step S404 of FIG. 4.

More specifically, the screen shown in FIG. 10 is the screen to be displayed in the process of the step S404 after the user requests the history information in the step S401 of FIG. 4 by selecting the "DESIGNATE FROM RECENTLY USED DOCUMENTS" button 1002 on the document operation screen 800.

On the center list screen 1001 shown in FIG. 10, the document list generated based on the access right information and the history information is displayed.

Consequently, even if the user B does not operate or handle the folder tree 802 and the list screen 803 (FIG. 8), the names of the desired documents are displayed on the list screen, the user B can easily execute the document selection.

Typically, the user interface of the device such as the print device 110 is smaller in size than that of the PC, whereby it is difficult for the user to operate or handle it. For this reason, if it is possible to decrease the user's operations even by one, it is possible to make the user interface significantly easy-usable for the user.

Next, a case where, after the user A scanned the documents 1 and 2 by the print device 110, the user B prints the document 1 by using the history information of the scan operation will be explained with reference to FIG. 11.

FIG. 11 is the diagram for explaining a modification of the history information storage process to be executed by the document management system 1 shown in FIG. 1.

Figure 12:
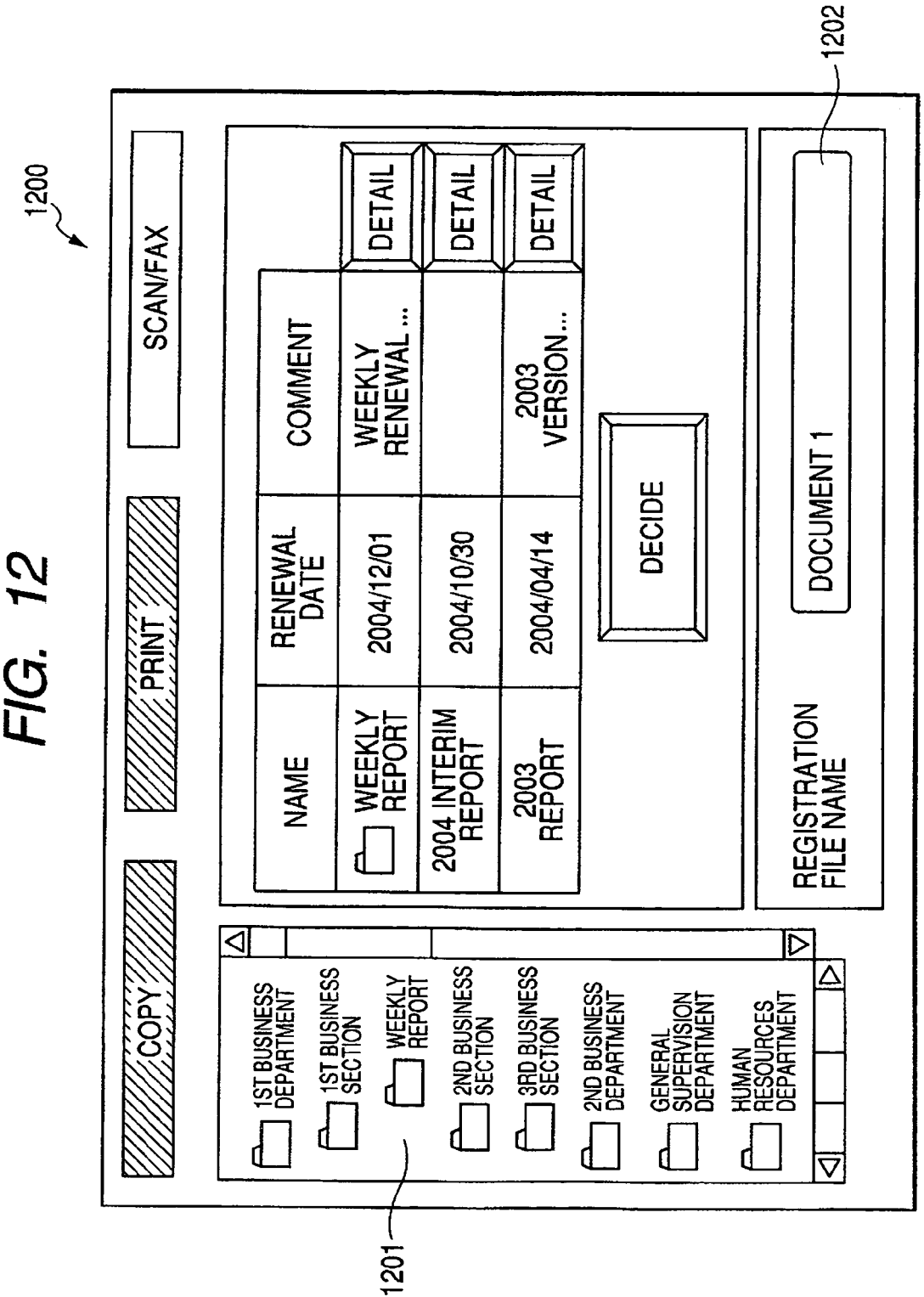
FIG. 12 is a diagram showing, in the case where the scan operation is selected by the user, the display screen to be displayed after the "DESIGNATE FROM LIST" button is depressed on the document operation screen of the information display unit shown in FIG. 1.

In FIG. 11, the print device 110 first displays the document processing menu on the information display unit 114. Then, if a user C scans new document data in the displayed document processing menu to request the process to be registered to the document management server 120 (scan registration request) (step S1101), the process same as the login process to the user A shown in FIG. 3 is executed. Subsequently, if the user C is logged for the document management sever 120, a document operation screen 1200 as shown in FIG. 12 is displayed on the information display unit 114.

After then, the storage destination folder ("FIRST BUSINESS SECTION" folder) in a folder tree 1201 disposed at the left on the document operation screen 1200 is selected by the user, the document name ("DOCUMENT 1") of the new document acquired by the scan is input by the user to a registration file name description section 1202, and the "DECIDE" button is then depressed by the user. Thus, the print device 110 scans a paper original set on the scan execution unit 116 (step S1102), converts the scanned data into the electronic data by the information processing unit 113, and then transmits the scanned electronic data, the document name and the storage folder information from the communication unit 112 to the document management server 120 (step S1103).

Subsequently, the document management server 120 registers the received electronic data to the document information 121 as the folder destination and the document name both designated by the user on the document operation screen 1200. At this point, since the access right to the document 1 is given only to the user A, the information representing that the user A can access the document 1 is registered to the access right information 122. Further, when the electronic data is registered to the document information 121, the document ID information by which the registered document can be uniquely specified is generated and registered together. When the registration of document ends, the document management server 120 transmits the registration end notification, and the information representing the registered document name and the document ID issued at the time of registration to the print device 110.

If the registration end notification is received from the document management server 120, the print device 110 registers the registered document ID and the date and time when the registration was executed to the history information management unit 111 as the history of registration (step S1104). In addition, it should be noted that the document 2 is registered in the manner same as above.

After the above registration process ended, the user C accesses the document management server 120 from the PC 140 to set the access right to the registered documents 1 and 2 (step S1105).

After then, a user D can print the document 1 based on the history information of the scan registration process shown in FIG. 11, by executing the process same as the reprint process in FIG. 4 executed by the user B.

FIG. 3 is the diagram for explaining the history information storage process which is executed by the document management system 1.

According to the processes shown in FIG. 11, after the history information is newly added and registered through the processes shown in FIG. 4 (step S1104), and if the access right of the newly registered document is set by the PC 140 to the document management server 120 (step S1105), then the print device 110 can execute the print process same as that shown in FIG. 4 on the basis of the operation or handling by the user D. Consequently, even if the scan registration process was executed in the print device 110 in the past, it is possible to execute the print process based on the history information thereof.

Likewise, after the shared document was registered from the print device 110, if the access right to the shared document is set to all the users of the relevant system, it is possible for other users to easily execute the print by using the registered history information.

Incidentally, it should be noted that the print format setting information may be included in the information to be managed as the history information. In the history information storage process in this case, the print format information designated by the user in the step S308 as shown in FIG. 13 is included as the information to be stored as the history information in the step S309 of FIG. 3. Further, in the reprint process to be executed thereafter, the print format setting screen is not displayed in the step S408 of FIG. 4, and the document data designated by the user in the step S405 is printed with the print format of the print format information included in the history information with respect to the relevant document data.

Thus, since the print format of the document data which was set in the past print process is set as the print format when the reprint process of the relevant document data is executed based on the history information, it is unnecessary for the user to set the print format in the reprint process, whereby it is possible to more simplify the user's operation.

Further, for example, in a case where the user who is skilled in setting the print device 110 once executed the print with the complicated print setting, it is then possible for another user who is not skilled in setting the print format to easily execute the reprint with the relevant complicated print setting based on the history information.

Furthermore, it can be obviously understood that the object of the present invention can be attained even in a case where a storage medium (or a recording medium) storing therein the program codes of software to achieve the functions of the above embodiment is supplied to a system or a device, and thus the computer (or CPU, MPU) in the system or the device reads and executes the program codes stored in the medium.

In this case, the program codes themselves read out of the storage medium achieve the functions of the above embodiment, whereby the storage medium storing these program codes constitutes the present invention.

Further, it can be obviously understood that the present invention includes not only the case where the functions of the above embodiment are achieved by executing the program codes read by the computer, but also the case where an OS (operating system) or the like running on the computer executes a part or all of the actual processes based the instructions of the program codes and thus the functions of the above embodiment are achieved by these processes.

Furthermore, it can be obviously understood that the present invention also includes a case where, after the program codes read out of the storage medium are written into the memory of a function expansion card inserted in the computer or the memory in a function expansion unit connected to the computer, the CPU or the like provided in the function expansion board or the function expansion unit executes a part or all of the actual processes based on the instructions of the program codes, and thus the functions of the above embodiment are achieved by these processes.

Moreover, because the form of such a program is no object if it has the actual function as the program to be achieved by the computer, an object code, a program executed by an interpreter, script data supplied to the OS, and the like may be included as the program.

As the storage medium for supplying the program, for example, a RAM, an NV-RAM, a Floppy™ disk, an optical disk, a magnetooptical disk, a CR-ROM, an MO, a CD-R, a CD-RW, a DVD (DVD-ROM, DVD-RAM, DVD-RW, DVD+RW), a magnetic tape, a nonvolatile memory card, another ROM, or the can be used, if the relevant medium can store the program. Alternatively, the relevant program is supplied by downloading it from a not-shown another computer, a database or the like connected to the Internet, a commercial network, a local area network or the like.

This application claims priority from Japanese Patent Application No. 2005-061333 filed Mar. 4, 2005, which is hereby incorporated by reference herein.

What is claimed is:

1. A document processing device comprising:
an authentication unit adapted to authenticate a user,
a history information storage unit adapted to store history information including identification information indicating print operation histories of printed documents,
a user access right judgment unit adapted to generate reprint information indicating documents from the printed documents that are capable of being reprinted by the authenticated user by judging whether or not the authenticated user has an access right to document data corresponding to each of the printed documents indicated by the identification information included in the history information,
a display unit adapted to display the reprint information to enable a user to select a document from the documents capable of being reprinted to which the authenticated user has the access right, and
a processing unit adapted to process document data corresponding to the document selected by the authenticated user.

2. A document processing device according to claim 1, wherein
said user access right judgment unit comprises:
a document ID transmission unit adapted to transmit a document ID of a document indicated in the history information and a user ID of the authenticated user, to a document management server, and
a received document ID judgment unit adapted to, in a case where a document ID is received from said document management server, judge that document data corresponding to the received document ID is document data to which the authenticated user has the access right, and
said document management server comprises:
a user access right setting unit adapted to set the access right with respect to document data corresponding to each document ID of document data to be managed and with respect to each user ID of a user to which authentication is possible, and
a document ID transmission unit adapted to transmit to the user access right judgment unit, a document ID, from among document IDs transmitted by said document ID transmission unit, corresponding to document data that the access right has been set with respect to a user ID transmitted by said document ID transmission unit.

3. A document processing device according to claim 1, wherein
the history information includes information concerning a name of document data that was processed, information concerning a storage destination of document data in a document management server, and information concerning date and time when document data was processed, and
in case of displaying a list of the document data, said display unit displays information included in the history information together with the list.

4. A document processing device according to claim 1, wherein
the processing unit is adapted to perform a print process for printing document data managed by a document management server, and
said document management server comprises an update unit adapted to update the history information when the print process ends.

5. A document processing device according to claim 4, wherein
the history information further includes information concerning a print format set in case of executing the print process, and
said processing unit sets the print format of document data selected by the authenticated user to be the print format of the document data selected by the authenticated user and included in the history information.

6. A document processing device according to claim 1, wherein
the processing unit is adapted to perform a scan registration process for acquiring image data by scanning an original and registering the acquired image data as document data to be managed by a document management server, and
said document management server further comprises an update unit adapted to update the history information when the scan registration process ends.

7. A document processing control method comprising:
an authentication step of causing a client device to authenticate a user;
a history information storage step of causing the client device to store history information including identification information indicating print operation histories of printed documents;
a user access right judgment step of causing the client device to generate reprint information indicating documents from the printed documents that are capable of being reprinted by the authenticated user by judging whether or not the authenticated user has an access right to document data corresponding to each of the printed documents indicated by the identification information included in the history information;
a display step of causing the client device to display the reprint information to enable a user to select a document from the documents capable of being reprinted to which the authenticated user has the access right, and
a processing step of causing the client device to process document data corresponding to the document selected by the authenticated user.

8. A storage medium which stores a program for causing a computer to execute a document processing control method, said program comprising:
an authentication module of causing a client device to authenticate a user;
a history information storage module of causing the client device to store history information including identification information indicating print operation histories of printed documents;

a user access right judgment module of causing the client device to generate reprint information indicating documents from the printed documents that are capable of being reprinted by the authenticated user by judging whether or not the authenticated user has an access right to document data corresponding to each of the printed documents indicated by the identification information included in the history information;

a display module of causing the client device to display the reprint information to enable a user to select a document from the documents capable of being reprinted to which the authenticated user has the access right, and a processing module of causing the client device to process document data corresponding to the document selected by the authenticated user.

* * * * *